United States Patent [19]

Brandstetter et al.

[11] Patent Number: 4,645,300

[45] Date of Patent: Feb. 24, 1987

[54] FOURIER PLANE RECURSIVE OPTICAL FILTER

[75] Inventors: Robert W. Brandstetter, Levittown; Nils J. Fonneland, Lake Ronkonkoma; Charles E. Lindig, Huntington, all of N.Y.

[73] Assignee: Grumman Aerospace Corporation, Bethpage, N.Y.

[21] Appl. No.: 635,936

[22] Filed: Jul. 30, 1984

[51] Int. Cl.$^4$ .................. G02B 27/46; G06G 9/00
[52] U.S. Cl. ............................................. 350/162.12
[58] Field of Search ............... 350/162.13, 162.14, 350/162.12, 3.85, 3.6; 364/822

[56] References Cited

U.S. PATENT DOCUMENTS

| | | | |
|---|---|---|---|
| 3,578,846 | 5/1971 | Chen | 350/162.14 |
| 3,602,718 | 8/1971 | Michon | 350/163 |
| 3,632,182 | 1/1972 | Sincerbox | 350/3.85 |
| 3,675,985 | 7/1972 | Gloge | 350/157 |
| 4,035,062 | 7/1977 | Fletcher et al. | 350/162.12 |
| 4,082,431 | 4/1978 | Ward III | 350/3.82 |
| 4,522,466 | 6/1985 | Lindig et al. | 350/162.12 |

OTHER PUBLICATIONS

Jablonowski et al., *Applied Physics, vol. 8, No. 1, Sep., 1975, pp. 51–58.*

Primary Examiner—Ronald J. Stern

[57] ABSTRACT

An optical recursive filtering system in which a signal beam of optical radiation is passed through the optical filtering means a multiplicity of times. The filtering system has an optical Fourier transform means, a spatial filter, optical inverse Fourier transform means and a pair of reflectors in the Fourier plane of the spatial filter. An input signal beam to be filtered is optically Fourier transformed by the transform means and is passed through the spatial filter where unwanted frequencies of the signal beam are attenuated. The filtered beam is reflected by one of the reflectors back through the filter and the second mirror reflects it back through the filter a third time. Subsequent reflections back through the filter with a consequent further filtering of the signal beam can be accomplished by appropriately positioning the reflectors. After multiple filtering passes, the filtered beam is extracted for utilization. By maintaining the recursions of the beam in the Fourier plane of the filter, which preferably is of a programmable type, the optical throw of the filter system can be significantly reduced and a flexible imaging system without the restraints of external recursion is realizable in a robust structure with fewer components. An embodiment of the system being used in a heterodyning RF optical filtering system is described.

10 Claims, 8 Drawing Figures

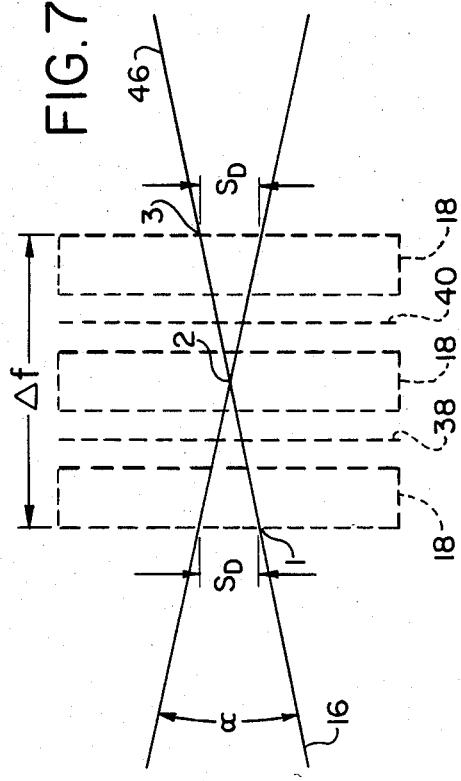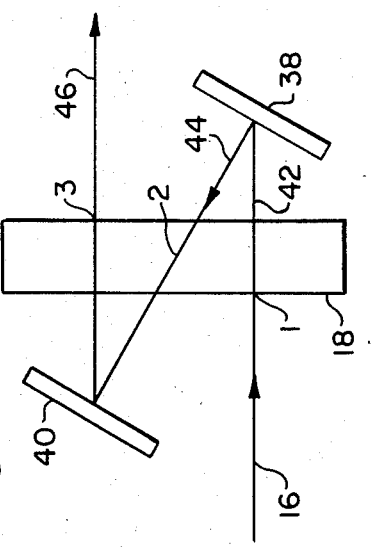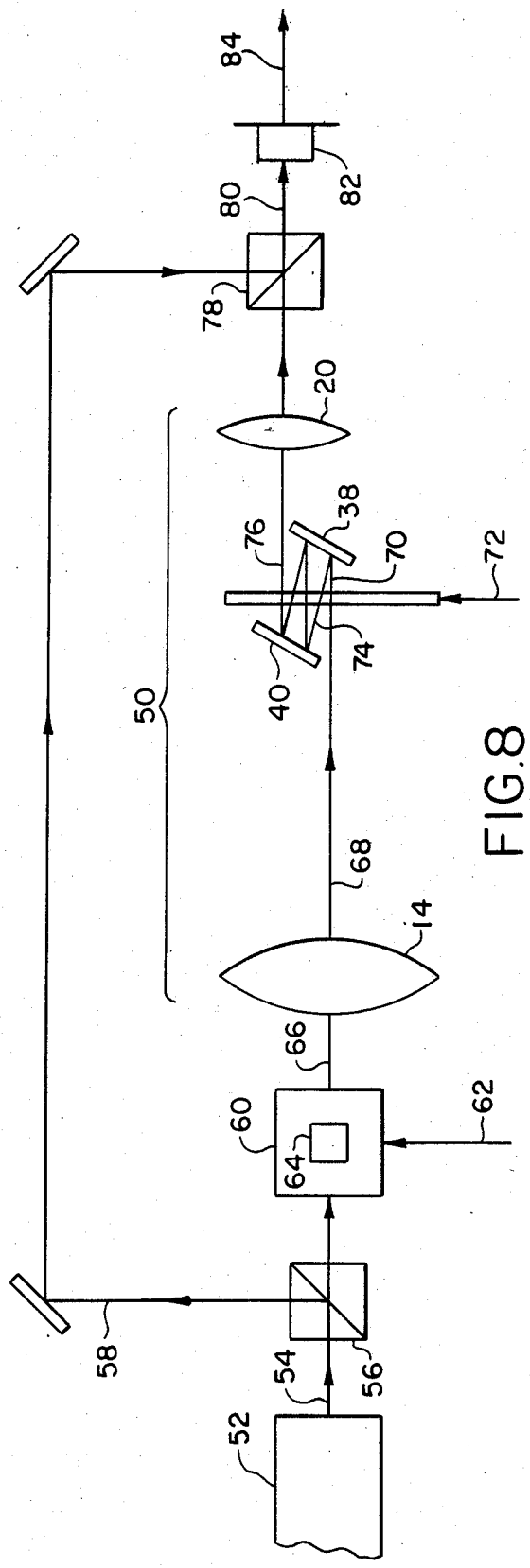

FOURIER PLANE RECURSIVE OPTICAL FILTER

BACKGROUND OF THE INVENTION

1. Field of The Invention

This invention relates to optical information processing and, more particularly, to recursive optical filtering means in which recursion is accomplished in the Fourier plane of the optical filter to reduce the throw of the optical train.

2. Discussion Of The Prior Art

In selective spatial frequency filtering, there are significant advantages in accomplishing the filtering function optically instead of by use of the more usual electronic filter, particularly if a number of filters are desired. Optical spatial filtering in the prior art is typically accomplished with filtering systems having a single stage. In those single-stage prior art systems, particularly those using a programmable spatial filter (PSF), the maximum filter attenuation is about 25 dB, which is the maximum attenuation realizable with presently available components with a single-stage PSF.

In the prior art, R. W. Brandstetter, A. R. Doucette, and C. E. Lindig disclose an optical filtering system in which the radiation being processed is caused to make multiple passes through the filter to provide a significant improvement in the attenuation achievable with the filter. In that prior art system, disclosed in patent application Ser. No. 498,462, filed May 26, 1983, which matured into U.S. Pat. No. 4,522,466 and assigned to the assignee in the present patent application, the PSF stages are effectively cascaded by means of recursions and the attentuation achieved thereby can be increased as a function of the number of stages or recursions.

SUMMARY OF THE INVENTION

This invention is an optical filtering system in which a beam of coherent collimated optical radiation is passed through optical filtering means a multiplicity of times before being extracted for utilization. The optical filtering means comprises means for making an optical Fourier transform of the input beam, an optical filter for filtering the transformed input beam, means for passing the filtered beam recursively a multiplicity of times through the filter in the Fourier plane thereof, and means for making an output inverse optical Fourier transform of the filtered beam. Suitably, the means for making the optical transforms are lens systems and the filter is a spatial filter, preferably of the programmable type. An array of reflectors or refractors are arranged to pass the beam exiting from the optical filter back therethrough in the Fourier plane of the filter to obtain the desired number of filtering passes. Optical inverting means can be incorporated into the system to invert the beam as required.

Recursive filtering results in improved attenuation of the undesired portion of a signal being processed. Compared to electronic filter stages where a filter stage must be provided for each resolution element m for a total of n×m electronic filters, where n is the number of filter stages per resolution element; e.g., 6–10, and m the resolution ($1=m\leq200$), a maximum of 2000 electronic filters can be obtained with a single optical filtering system with a resolution of 200 using this invention. In this invention, the attenuation of unwanted frequencies is multiplied by a factor determined by the number of recursions n. Results obtained from a single spatial filter and transform lens pair are effectively the same as cascading the filtering system n times when allowance is made for diffraction effects and other system artifacts.

In a preferred embodiment, the recursive filtering means is disclosed as being incorporated in an optical filtering system for RF signals. In that embodiment, the RF input signals are fed into an acousto-optic modulator to modulate a laser beam. The modulated output beam is passed through an optical Fourier transform lens to produce a spatial frequency distribution at its back focal plane. This signal contains a one-for-one spatial and temporal correspondence with the RF frequency distribution. The transformed beam is then directed through the spatial filter which is also located at the back focal plane of the transform lens. The optical filter referred to herein can be of a non-programmable or of a programmable (PSF) type and, as is well known in the art, the filter can be activated electronically, mechanically, thermally, or by light. If a PSF is used for the filtering function, optical transmission from point-to-point is controlled by the PSF such that it is possible to block some spatial frequencies and to pass others in accordance with the programmed notch frequencies. Optical spatial frequencies passing through the spatial filter, consist of the laser optical carrier frequency modulated with the radio frequency (RF). This output is directed by the recursive reflector (or defractor) array a plurality of times through the optical filter at the Fourier plane thereof. This recursively filtered beam is directed through the optical inverse transform lens and then passed to an optical mixing means where it is mixed with a local oscillator reference beam. Optically combining the modulated laser beam with the local oscillator beam and impinging the sum on a square-law photodetector results in the generation of the difference frequency by a heterodyning action. The electrical output of the photodetector is amplified and initially filtered and then subjected to conventional post processing.

It is thus an object of the invention to provide means in an optical system for recursively passing a signal beam a multiplicity of times through a single optical spatial filter such that the attenuation of unwanted signal frequencies is multiplied.

It is a further object of the invention to provide an optical system for effectively cascading the spatial filtering stages in a single compact closed-loop recursive stage.

A yet further principal object of the invention is to accomplish the recursion of the signal beam through the single optical spatial filter in the Fourier plane thereof such that the throw of the optical train is shortened so that the overall size of the optical filter system is reduced.

Yet another object of the invention is to permit optical Fourier transform means of unequal focal length to be used in a recursive optical spatial filter system.

It is another object of the invention to provide an optical system for the adaptive noise filtering of RF spectra.

A further object of the invention is to provide a recursive optical filtering system in which recursion is accomplished in the Fourier plane such that the number of optical elements required are appreciably reduced and a more rigid structure is obtained.

Other objects and advantages will become apparent from a reading of the Specification and a study of the accompanying drawings.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

FIG. 6 is a schematic view of the filter and recursion means of FIG. 4 in greater detail;

FIG. 7 is an unfolded development viewed from the top showing beam divergence for three filtering passes of the recursive system of FIG. 4; and FIG. 8 is schematic side elevation of the recursive optical filtering system of the invention embodied in a heterodyning optical filter system.

DESCRIPTION OF THE PREFERRED EMBODIMENTS

Recursive techniques can be used in optical spatial filtering systems to obtain exceedingly deep notches at selected locations in the pass band of the receiver when optical means are employed for the adaptive noise filtering of RF spectra. In recursive optical heterodyning notch filter systems, it is required that the focal length of the Fourier transform lens used in the system be increased to increase the Fourier plane size. This can be expressed as:

$$D_F = \frac{\lambda BW}{V_A} F \quad (1)$$

where BW is the receiver bandwidth; $\lambda$ is the laser wavelength; $V_A$ is the acoustic velocity of the acoustooptic modulator (AOM); F is the focal length of the Fourier transform lens; and $D_F$ is the Fourier plane dimension. The dimension $D_F$ is determined by the size and resolution of the PSF, the smaller the PSF, the smaller the $D_F$, and, consequently, the smaller F must be.

Figure 1:
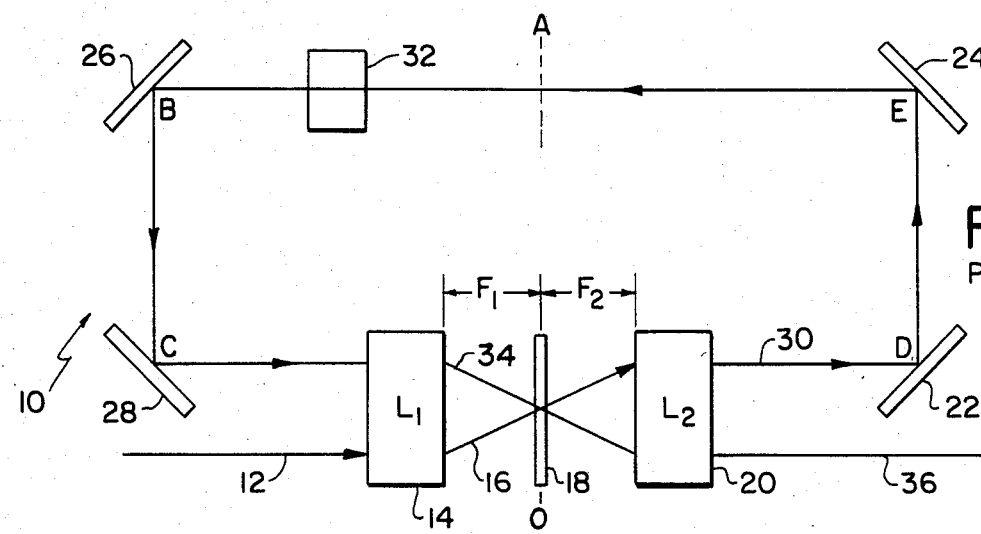
FIG. 1 is a schematic top view of a prior art recursive filtering system.

In general, practical sizes for a PSF dictate Fourier lenses of long focal length. In a recursive optical heterodyning notch filter system, however, the use of long focal length lenses to obtain a large Fourier plane can cause the overall physical size of the system to become excessive. For example, if a one-meter focal length were used, a recursive arrangement would necessarily result in an overall system size of approximately two meters by $1\frac{1}{2}$ meters. This will be better understood, perhaps, if reference is made to the prior art recursive filter system shown in FIG. 1. In that recursive system 10, an input signal beam 12 is directed through an optical Fourier transform means such as lens 14 and the transformed beam 16, after being filtered by spatial filter 18, is passed through inverse optical Fourier transform means such as lens 20. A closed loop of reflectors such as mirrors 22, 24, 26, and 28 direct the output beam 30 from inverse transform lens 20 back through transform lens 14. Optical inverting means such as dove prism 32 can be used to invert the image beam as required. The beam 34 exiting the transform lens 14 is again filtered by spatial filter 18 and, after being inverse transformed by lens 20, the output beam 36 is extracted for utilization. In the system of FIG. 1, the plane defined by A coincides with the front and back focal planes of $L_1$ (lens 14) and $L_2$ (lens 20) respectively as does 0 for the back and front focal planes. Lenses $L_1$ and $L_2$ in FIG. 1 are assumed to be of a telephoto design where the nodal points are external to the lenses. Thus, if the focal length is one meter and $F_1 = F_2$, then ABCO = 2F = 2 meters.

Figure 2:
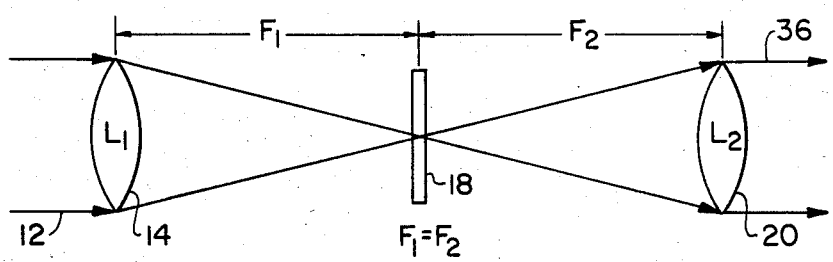
FIG. 2 is a schematic top view illustrating an equal transform relationship in a conventional single-pass spatial filtering system.
Figure 3:
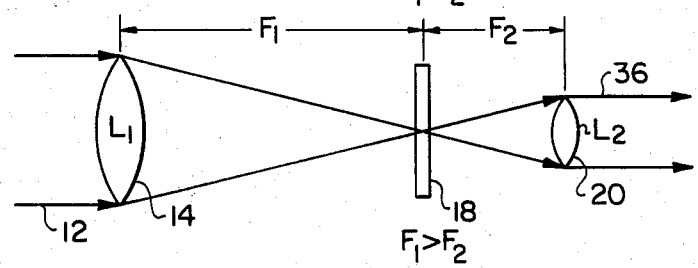
FIG. 3 is a schematic top view illustrating a scaled transform relationship possible in a conventional single-pass spatial filtering system.

In a conventional single-pass spatial filtering system, the transform relationship can be equal with $F_1 = F_2$ (FIG. 2); or the transform relationship can be scaled; i.e., $F_1$ can be made greater than $F_2$, thereby reducing the throw of the optical train (FIG. 3). This arrangement gives the required $D_F$ and Fourier plane resolution with a given spatial filter using a long $F_1$, where it is needed, with a shorter $F_2$ for a reduced throw. (In FIGS. 2 and 3, $L_1$ is a Fourier transform lens 14, $L_2$ is an inverse Fourier lens 20, 18 is a spatial filter, and F is the focal length.)

However, the recursive spatial filtering system taught in the prior art demands a precise transform/inverse transform relationship; with recursion requiring that $L_1 = L_2$ to be maintained. Because of this constraint, therefore, it is not possible to substitute the lenses and spatial filter arrangement of FIG. 3 for the lenses and spatial filter arrangement of FIG. 1 if it is desired to reduce the optical throw of a prior art optical recursive filter system of the type shown in FIG. 1.

Figure 4:
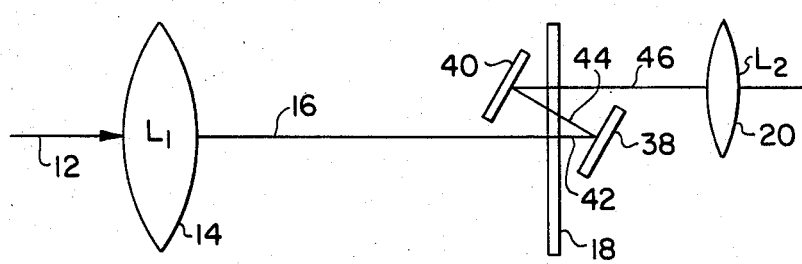
FIG. 4 is a schematic side elevation illustrating a scaled transform relationship with recursive filtering in the Fourier plane of the filter of the recursive system of the invention.

We have discovered, however, that if the recursions are accomplished in the Fourier plane of the spatial filter, the correct transform/inverse transform relationship with flexibility of object-image location is maintained and a scaling of the lenses to reduce the optical throw of the system is possible. FIG. 4 shows the invention embodied in a design which performs recursions in the Fourier plane of the spatial filter thus achieving the reduced optical throw attainable with the arrangement illustrated in FIG. 3. The FIG. 4 design has a Fourier transform lens ($L_1$) 14, a spatial filter 18, an inverse Fourier transform lens $L_2$ 20 which has a shorter focal length than lens 14, and recursion means such as mirrors 38 and 40. Although mirrors are preferably used, any suitable known reflecting or refracting means can be employed to perform the recursions. The present invention provides an optical recursive filter system which has the capability of permitting image formation at various locations while still allowing the desired filter recursions to be obtained. In this invention the designer is afforded a plurality of possible object-image solutions whereas the FIG. 1 arrangement permits only a single object-image solution; i.e., the transform lens has to be precisely identical to the inverse transform lens. In the FIG. 1 arrangement, the lenses are dependent upon one another; in the present invention, the designer is free to select lenses of different focal lengths and placement to suit his requirements.

Figure 5:
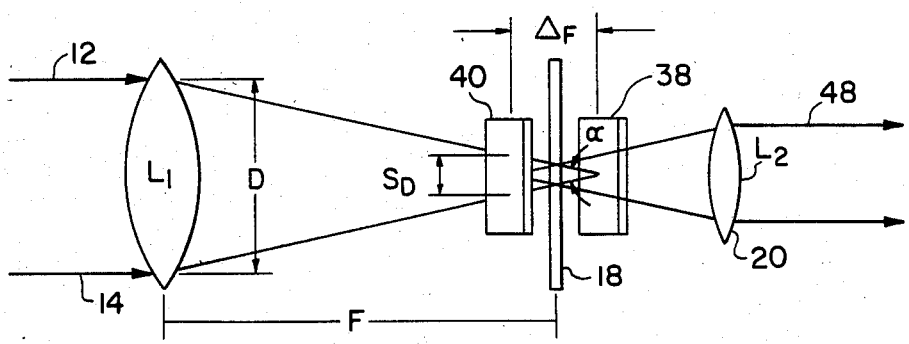
FIG. 5 is a schematic top elevation of the recursive system of FIG. 4.

In the operation of the FIG. 4 embodiment, an input beam 12 is directed through Fourier transform means 14 and the transformed beam 16 therefrom is filtered by spatial filter 18 whose output beam 42 is reflected by mirror 38. Reflected beam 44 from the mirror 38 is directed back through the spatial filter and in turn is reflected by mirror 40 back through the spatial filter. The recursively filtered output beam 46 therefrom is inversely Fourier transformed by lens 20 and the output beam 48 is extracted for any necessary further processing. Three Fourier plane recursions are shown in FIG. 4, but any desired number of recursions can be obtained by adjusting appropriately mirrors 38 and 40. The number of recursions can be limited, however, by the required frequency plane resolution compared to the geometric spot $S_D$. This perhaps will be better understood with reference to the top view of the recursive filter system of the invention in FIG. 5 where $\Delta f$ is the unfolded interval (see FIG. 7) over which the divergence occurs in the Fourier plane recursion and $\alpha$ is the angle of convergence or divergence. This is shown in greater detail in the side view of FIG. 6 and the unfolded top view of FIG. 7 where $\Delta f = \overline{123}$.

The unfolded development of FIG. 7 shows how the beam divergence for three filtering passes of the recursive arrangement of FIG. 4 viewed from the top is related to the resolution of the PSF and its position with respect to the focal point of lens 14. An approximate development is illustrated in FIG. 7 where the refractive index of unity for the PSF is taken as unity. Furthermore, FIG. 7 shows the focal point of lens 14 to be located in the mid-plane of the unfolded PSF such that $S_D$ of the first and third passes are equal. This condition is not mandatory and the PSF can be moved toward or away from lens 14 to vary the position of the focal point such that a $S_D$ to suit the requirements is attained. It is believed that the unfolded development illustrated in FIG. 7 satisfactorily demonstrates the principle involved although it is known that more precise methods for accounting for the PSF passes can be applied.

The expression for maximum spot divergence ($\alpha$) is given by:

$$\alpha = 2 \operatorname{Tan}^{-1}\left(\frac{D}{2F}\right) \tag{2}$$

where $$S_D = \Delta f \operatorname{Tan}\left(\frac{\alpha}{2}\right) \tag{3}$$

when D is equal to the maximum lens aperture $$\alpha = 2 \operatorname{Tan}^{-1}\left(\frac{1}{2 f/n}\right). \tag{4}$$

For a given spatial filter (SF) resolution of $N_{SF}$ (in units of filter elements per unit length) the maximum $S_D$ is given by:

$$S_D = \frac{1}{N_{SF}}. \tag{5}$$

This assumes that the spot size of beam 16, at 1 in FIG. 7, given by:

$$A_S = \frac{2\lambda F}{D} \tag{6}$$

is much smaller than a single SF element or $$A_S << \frac{1}{N_{SF}} \tag{7}$$

As has been pointed out previously herein, the Fourier plane recursive optical filter system of the invention can be used advantageously in a heterodyning optical notching filter system such as that shown in FIG. 8. It will be understood, of course, that although the recursive system of the invention is described in this embodiment as being used with such heterodyning filter system, such use is not to be construed as a limitation thereto. In this embodiment, the recursive filter system 50 of the invention comprises an optical Fourier transform means such as double-convex lens 14, a spatial filter 18 of a programmable type, a first mirror 38, a second mirror 40, and an inverse optical Fourier transform means such as double-convex lens 20. Other known transform producing means such as holographic lenses or the like can be employed, of course, instead of the double-convex lens. The Fourier plane recursive optical filter of this invention has been implemented and has operated substantially as described herein. The apparatus of the invention has been operated successfully with commercially available electronically addressable liquid crystal PSF's utilizing both twisted nematic and dynamic scatter materials.

The heterodyning system embodied in FIG. 8 comprises a light source 52 producing a beam 54 of collimated, substantially coherent radiation which, after passing through beamsplitter 56 to derive a reference beam 58 therefrom, is directed through modulating means 60 for impressing spectral and/or temporal signal intelligence thereupon. An acoustooptic modulator such as the well-known Bragg Cell or the like can be used for the modulating means 60. An RF input signal 62 drives the transducer portion 64 phase modulating the optical medium of the modulator 60 to impress an RF signal modulation on the output beam 66 exiting the modulator. Beam 66 is introduced into the recursive filter system 50 where it is transformed by lens 14 and the transformed image 68 is passed through the PSF 18. Unwanted frequencies are filtered by the PSF 18, producing a spatially distributed and filtered RF spectramodulated optical output 70. In heterodyning radio and radar receivers employing programmable spatial filtering techniques, the RF signal is passed through a time integrating cueing optical receiver network which produces IF signal 62, which includes the desired signal input as well as noise, and a signal input 72 to PSF 18. Signal input 72 comprises the spatial location of noise in the received RF signal. The noise spectra location information in signal 72 is used to configure the PSF to reject the unwanted noise spectra in the optical domain of transformed image beam 68. Output beam 70 is reflected 74 by mirror 38 back through the PSF for a further attenuation of noise spectra. Reflected beam 74 is reflected by a second mirror 40 back through the PSF and, after subsequent reflections by both mirror 38 and mirror 40 and consequent passages through the PSF, the recursively filtered beam 76 is inversely Fourier transformed by lens 20. The inversely transformed signal is relayed to an optical mixer 78 where it is square law mixed with reference (local oscillator) beam 58 and the difference IF frequency signal 80 is detected by a photodetector 82. The photo detector output 84, which is an electrical signal, can be electronically filtered to remove outband noise and it can be otherwise subjected to conventional post-processing.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

Having thus described our invention, what we claim is:

1. In an optical recursive filter system of the type having a source of substantially coherent collimated optical radiation, and optical filtering means, said optical filtering means including means for producing an optical Fourier transform, an optical filter, means for producing an optical inverse Fourier transform, said optical filter being located in the focal plane of said Fourier transform producing means, recursive means for directing a beam of radiation from said source in a manner to traverse said optical filtering means a plurality of times such that the attenuation of unwanted spectral frequencies by said filtering means is enhanced, and means for extracting the filtered beam for utilization, the improvement comprising; the arranging of said recursive means in the optical path between said optical Fourier transform means and said optical inverse Fourier transform means such that the recursion of said beam through said optical filter is in the Fourier plane of said optical filtering means whereby the throw of the optical train can be shortened such that the overall size of said system can be reduced.

2. The system as described in claim 1 wherein the beam of optical radiation is modulated with RF spectra and wherein the optical filter is a programmable spatial filter which filters out unwanted frequencies.

3. The system as described in claim 1 wherein the means for producing the optical Fourier transform and the optical inverse Fourier transform are lens systems.

4. The system as described in claim 3 wherein the lens systems for producing the optical Fourier transform and the optical inverse Fourier transform are of equal focal length.

5. The system as described claim 3 wherein the lens system for producing the optical Fourier transform and the optical inverse Fourier transform are of unequal focal length.

6. The system as described in claim 5 wherein the focal length of the lens system for producing the optical Fourier transform is greater than the focal length of the lens system for producing the optical inverse Fourier transform.

7. The system described in claim 1 wherein the means for directing the beam of optical radiation recursively through the optical filter in the Fourier plane of said optical filtering means is an arrangement of reflectors.

8. The system as described in claim 1 wherein spectral intelligence is imposed on the beam from said radiation source.

9. An optical recursive filter for RF signals comprising; an RF signal source, a source of substantially coherent collimated optical radiation, an acoustic-optic modulator driven by RF signals from said RF source, an optical filtering means, said optical filtering means including means for producing an optical Fourier transform, an optical filter, means for producing an optical inverse Fourier transform, said optical filter being located in the focal plane of said Fourier transform producing means, recursive means in the optical path between said optical Fourier transform means and said optical inverse Fourier transform means for directing a beam of radiation from said source in a manner to traverse said optical filter a plurality of times in the Fourier plane of said optical filtering means, whereby RF signals from said RF source drive said acousto-optic modulator to impress the RF spectra on an optical radiation beam directed therethrough from said radiation source, the modulated beam from said modulator being redirected through said optical filter a number of times by said recursive directing means such that the attenuation of unwanted spectral frequencies by said filtering means is enhanced and the optical beam exiting from said optical filtering means carries filtered RF modulation.

10. The optical recursive filter as described in claim 9 wherein said filter also comprises an optical local oscillator, an optical beam combiner, detecting means for converting an optical signal into an electrical signal, and an electronic bandpass filter, and wherein the output beam from said optical filtering means is combined by said beam combiner with a beam from said local oscillator to produce a summed output which is incident on said detecting means whose electrical output is filtered by said bandpass filter to produce down-converted RF spectra.

* * * * *